United States Patent
Giraud

(10) Patent No.: US 7,228,463 B2
(45) Date of Patent: Jun. 5, 2007

(54) METHOD TO SECURE THE EXECUTION OF A PROGRAM AGAINST ATTACKS BY RADIATION OR OTHER

(75) Inventor: Nicolas Giraud, Le Chesnay (FR)

(73) Assignee: Axalto SA, Meudon (FR)

( * ) Notice: Subject to any disclaimer, the term of this patent is extended or adjusted under 35 U.S.C. 154(b) by 73 days.

(21) Appl. No.: 10/521,600

(22) PCT Filed: Jul. 18, 2003

(86) PCT No.: PCT/IB03/02847

§ 371 (c)(1),
(2), (4) Date: Jan. 18, 2005

(87) PCT Pub. No.: WO2004/010300

PCT Pub. Date: Jan. 29, 2004

(65) Prior Publication Data
US 2005/0229164 A1    Oct. 13, 2005

(30) Foreign Application Priority Data
Jul. 18, 2002  (EP) .................................. 02291812

(51) Int. Cl.
*G06F 11/00* (2006.01)

(52) U.S. Cl. ......................................................... 714/55
(58) Field of Classification Search .................... 714/55
See application file for complete search history.

(56) References Cited

U.S. PATENT DOCUMENTS

| | | | | |
|---|---|---|---|---|
| 4,535,453 A * | 8/1985 | Rhodes et al. | ............... | 370/384 |
| 5,333,285 A * | 7/1994 | Drerup | ........................ | 714/23 |
| 5,408,643 A * | 4/1995 | Katayose | ...................... | 714/55 |
| 5,664,090 A * | 9/1997 | Seki et al. | ..................... | 714/15 |
| 6,026,454 A * | 2/2000 | Hauck et al. | .................. | 710/65 |
| 6,370,603 B1 * | 4/2002 | Silverman et al. | ............ | 710/72 |
| 6,560,726 B1 * | 5/2003 | Vrhel et al. | .................... | 714/55 |
| 2001/0049762 A1 * | 12/2001 | Ohwada | ..................... | 710/240 |
| 2005/0251655 A1 * | 11/2005 | Yamazaki | .................... | 712/214 |

* cited by examiner

Primary Examiner—Bryce P. Bonzo

(57) ABSTRACT

The method according to this invention concerns a method to secure the execution of a program stored in an electronic assembly comprising information processing means and information storage means. The method consists in checking the execution time of at least one sequence in said program with respect to the normal predetermined execution time of said sequence. This invention also concerns the electronic module in which said method is implemented and the card comprising said module.

14 Claims, 1 Drawing Sheet

METHOD TO SECURE THE EXECUTION OF A PROGRAM AGAINST ATTACKS BY RADIATION OR OTHER

This invention concerns a method and a device to secure an electronic assembly implementing a program to be protected. More precisely, the purpose of the method is to propose a defence against attacks by radiation, flash, light or other and more generally against any attack disturbing the execution of the program instructions.

TECHNICAL FIELD

When executing a program, attacks by radiation modify the instruction codes executed by the processor. The program instructions are replaced by inoperative instructions. Consequently, certain sections of the code fail to execute or execute irregularly, for example the execution of inoperative instructions instead of a security processing sequence.

This applicant filed a French patent application No. 0016724 on 21 Dec. 2000 concerning a method to secure the execution of a program stored in a microprocessor controlled electronic module, as well as the associated electronic module and integrated circuit card. The prior art described in said application applies to this invention. The solution protected in said application consists in triggering interrupts intermittently and thereby diverting the program execution to protect against possible attacks. This solution offers a good probability of detecting and preventing the attacks by radiation. However, some attacks may not be detected, especially if the attack occurs briefly between two interrupts.

One purpose of this invention is to propose efficient protection even for very short attacks.

Another purpose of this invention is to propose a solution which could be implemented in the current components without adaptation, which consumes few resources and which does not reduce the performance of the assembly in which it is implemented.

SUMMARY OF THE INVENTION

This invention concerns a method to secure the execution of a program in an electronic assembly comprising information processing means and information storage means, characterised in that it consists in checking the execution time of at least one sequence of said program with respect to the normal predetermined execution time of said sequence.

This invention also concerns an electronic module in which said method is implemented, a card comprising said module and a program to implement said method.

BRIEF DESCRIPTION OF THE DRAWINGS

Other purposes, features and advantages of the invention will appear on reading the description which follows of the implementation of the method according to the invention and of a mode of realisation of an electronic system designed for this implementation, given as a non-limiting example, and referring to the attached drawings in which.

WAY OF REALISING THE INVENTION

Figure 1:
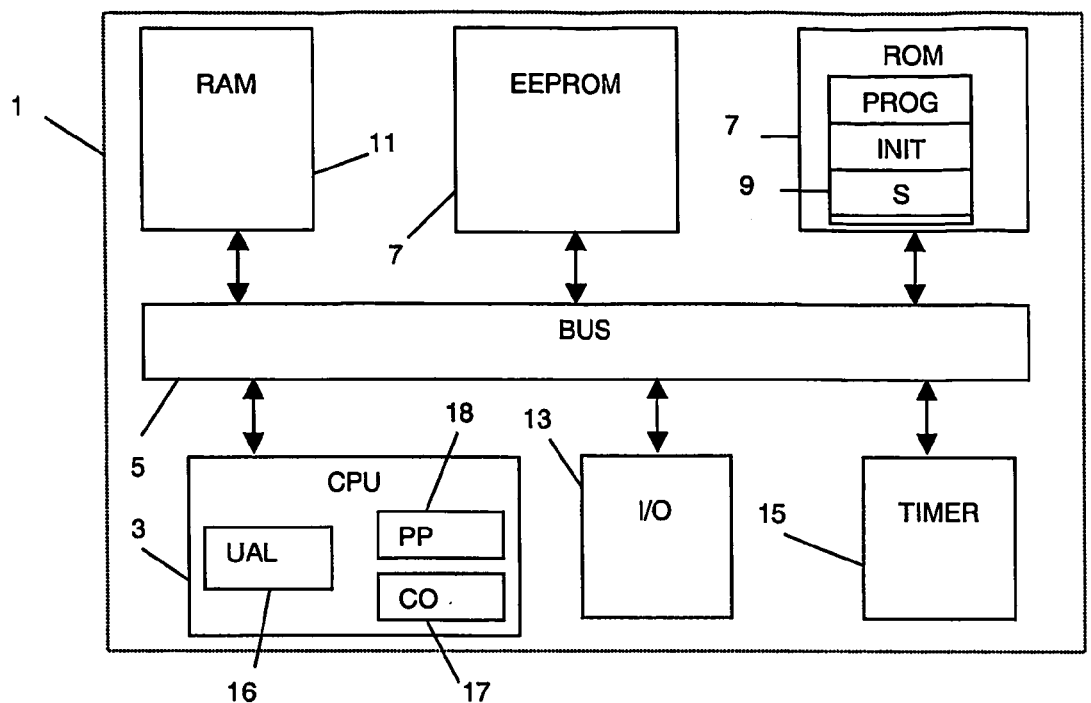
FIG. 1 is a diagrammatic representation of a mode of realisation of an electronic module according to this invention.

The purpose of the method according to the invention is to secure an electronic assembly and for example an onboard system such as a smart card implementing a program. The electronic assembly comprises at least a processor and a memory. The program to be secured is installed in the memory, for example ROM type, of said assembly.

As a non-limiting example, the electronic assembly described below corresponds to an onboard system comprising an electronic module 1 illustrated on FIG. 1. This type of module is generally realised as a monolithic integrated electronic microcircuit, or chip, which once physically protected by any known means can be assembled on a portable object such as for example a smart card, integrated circuit card or other card which can be used in various fields.

The microprocessor controlled electronic module 1 comprises a microprocessor CPU 3 with two-way connection via an internal bus 5 to a non volatile memory 7 of type ROM, EEPROM Flash, FeRam or other containing the program PROG 9 to be executed, a random access memory (RAM) 11, input/output (I/O) means 13 to communicate with the exterior and means 15 TIMER to evaluate the program execution time such as a counter with triggering of an interrupt on expiry. An exception is raised when the counter 15 expires. The exception is followed by diversion of the program code to an interrupt processing routine (ROUTINE—FIG. 2).

Traditionally, the microprocessor central processing unit CPU 3 illustrated on FIG. 1 comprises in particular an arithmetic and logic unit UAL 16, a program counter register CO 17 giving the address of the next instruction to be executed, a stack pointer register PP 18 giving the memory address of the top of the stack.

On CISC (Complex Instruction Set Computer) type components for smart card, the execution time of a sequence of instructions is the sum of the execution times of each instruction executed. The execution time of an instruction generally varies between 2 and 11 clock cycles. The execution of a sequence of instructions is characterised by the points of departure and arrival and the path followed, which is likely to include loops and branches.

Attack by radiation converts any instruction of variable execution time into an inoperative instruction of fixed execution time such as, for example, a NOP instruction (2 clock cycles on the SLE66 cards) or a BTJT instruction (5 clock cycles on the ST19 cards). The sequence attacked is converted into a "linear" sequence which consists in executing a series of inoperative instructions with incrementation of the program counter 17 CO with no loops or branches. The path followed is therefore modified and the point of arrival after the normal execution time will be different from that of the normal point of arrival. Even with a very short attack, the execution time of a sequence is changed slightly and the point of arrival after the normal execution time is different from that planned.

The method according to the invention consists in checking the execution time of at least one sequence S of the program 9 with respect to its normal predetermined execution time, which is invariable if there is no disturbance, and more precisely in checking that the execution of sequence S is at the planned point of arrival after the normal predetermined execution time T of said sequence. The check may concern, for example, one or more sensitive instruction sequences which require greater protection such as the cryptographic algorithms, the security processes or other.

Figure 2:
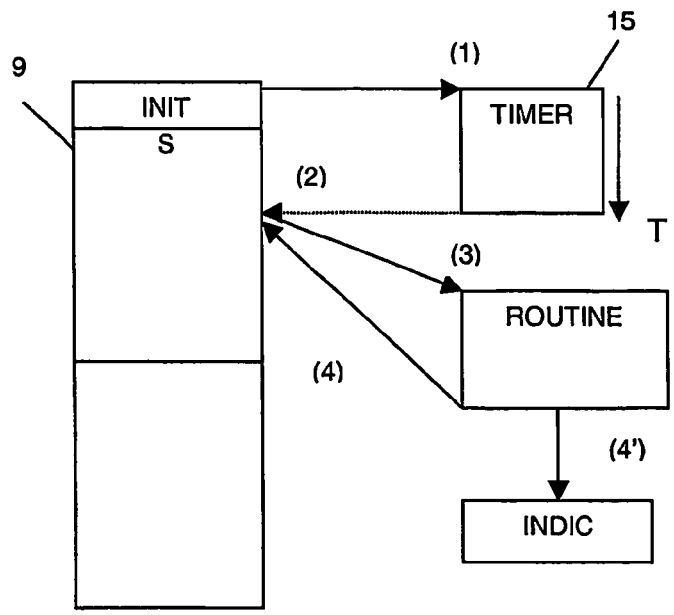
FIG. 2 is a diagrammatic representation of part of the module according to FIG. 1 in which the steps of the method according to this invention have been indicated.

As shown on FIG. 2 (step (1)), the counter TIMER 15 is started at the point of departure of execution of sequence S with an initialisation value corresponding to the normal execution time T of the processing concerned. A counter initialisation code INIT is added before the start of each sequence S to be protected.

The initialisation value is predetermined during development and must be constant: it must not vary during normal execution conditions. The interrupts likely to occur during execution of the interrupt are therefore deactivated, as well as the mechanisms designed to modify consumption during a processing operation (variation of the number of instruction cycles or introduction of additional cycles). If the sequence S includes branches, all execution paths must lead, on expiry of the processing execution time, to the same point of arrival, i.e. to the same instruction and more precisely to the same value of the program counter CO 17. The time of execution through each branch must therefore be equalised by adding null instructions such as for example NOP instructions. The processing duration is therefore the same no matter which branch is followed. Similarly, if the sequence S includes loops of variable execution time, resynchronisation loops must be added to compensate for the variations so that the total execution time remains constant.

A variable accessible by the counter interrupt processing routine is initialised with the value of the program counter CO 17 corresponding to the value expected at the normal point of arrival of the sequence S to be protected. On expiry of the counter 15 TIMER, an interrupt is raised (step (2), FIG. 2). The value of the program counter CO corresponds to the actual point of arrival: this value is saved at the address given by the stack pointer PP 18 and the code execution is diverted to the interrupt processing routine ROUTINE stored in ROM and/or in EEPROM and/or any non volatile memory (step (3)). The interrupt routine ROUTINE reads the value of the program counter CO at the end of normal execution time on the stack and checks that it corresponds to the expected value sent by variable as seen previously.

If the sequence has reached the planned point of arrival after the normal execution time, the interrupt processing routine ends and plans a normal return to the program diversion point (step (4)): program execution continues normally. Otherwise, disturbance in the execution of program sequence S is observed and an attack by radiation is detected. Various measures can then be taken such as, for example, interruption of program execution, setting of a fraud indicator (INDIC—step (4')) in non volatile memory 7 to indicate that a fraudulent attack has taken place and for example to prohibit any future use of the operating system.

To guarantee maximum efficiency, the point of arrival should only be reached once during execution of the sequence. If the sequence passes the point of arrival several times, there is a probability that execution of the sequence is at the point of arrival planned on expiry of the counter but not real considering the number of passages via the point of arrival, even if an attack by radiation has occurred and modified the sequence execution.

In the special case of RISC (Reduced Instruction Set Computer) components, most instructions are executed in one clock cycle. Consequently, if an attack by radiation substitutes for any instructions executing in one clock cycle inoperative instructions also executing in one clock cycle, it does not change the sequence execution time and the point of arrival remains the same: the attack cannot be detected. To guarantee detection in this special case, the method according to the invention consists in adding one or more short null loops in the code. The loops added increase the normal execution time of the instruction sequence to be protected. In the event of attack by radiation, the loops disappear and the sequence execution time is modified, so the attack can be detected.

Triggering of the processing on expiry of the counter is based on a hardware means which can withstand attacks by radiation.

Note that execution of the interrupt processing routine can be disturbed by an attack by radiation. According to a development of the invention, the method according to this invention is improved by placing the interrupt return instruction at the last memory location or just before a shared domain boundary. If an attack by radiation prevents execution of the interrupt return, the program counter CO is incremented at the next memory location which is outside the permitted program memory area. A procedure specific to the component is then carried out, for example on component ST19, generation of a non maskable interrupt (NMI) with reset. According to another additional development of the invention, a sequence to set a fraud indicator is introduced in non volatile memory after the interrupt return instruction.

Consequently, the method according to this invention can be used to detect any attack by radiation, irrespective of its duration, on a protected sequence. Said method is very economical in terms of resources and execution time. In terms of resources, the method only requires the addition of counter initialisation code, counter interrupt management routine code and possibly code to equalise the execution branches and resynchronise the loops. The execution time consumed by the method according to the invention for each protected instruction sequence corresponds to counter initialisation, execution of the interrupt processing routine and the code possibly added to equalise branches and resynchronise loops. The method can therefore be used to protect the code without reducing the performance in terms of code size and execution time. The method uses a counter with associated interrupt.

In addition, the choice of a counter with triggering of interrupt on expiry offers several advantages. Firstly, it is part of the basic equipment of microprocessor controlled electronic modules. Secondly, the programming involved is quite easy. It therefore represents a very simple and very reliable hardware means of triggering an interrupt without software intervention.

The method according to the invention can also be used to propose a defence against any attack unpredictably modifying an instruction sequence such as the DFA (Differential Fault Analysis) attack or other (unexpected jumps, modification or disturbance of the logic associated with the program counter CO, conversion of one instruction into another).

The invention claimed is:

1. A method to secure the execution of a program in an electronic assembly having information processing means and information storage means, the method comprising:
   checking the execution time of at least one sequence of said program with respect to the normal predetermined execution time of said sequence, by:
   planning an end of said normal predetermined execution time;
   planning a point of arrival of said at least one sequence of said program according to the normal predetermined execution time of said sequence;
   starting a counter timer with associated interrupt at the point of departure of execution of said sequence;

delivering an interrupt on expiry of said counter timer, wherein the expiry of said counter timer corresponds to the planned end of the normal predetermined execution time of said sequence;

determining an actual point of arrival of said sequence when said interrupt is delivered;

checking if the determined actual point of arrival of said sequence corresponds to said planned point of arrival.

2. The method according to claim 1, further comprising: checking that the planned point of arrival of said sequence is reached after completion of the normal predetermined execution time period so as to protect against attacks disturbing the execution of said program.

3. The method according to claim 2, comprising:

triggering at the start of said sequence an interrupt counter initialised to the value of the normal predetermined execution time of said sequence, triggering an interrupt in the program execution on expiry of the counter, and diverting execution of said program to an interrupt management routine in order to check the point of arrival of said sequence.

4. The method according to claim 3, wherein if the execution time of said sequence is not normal, said interrupt management routine is immediately followed by a sequence to set a fraud indicator in memory or by an interruption of the current execution by another means.

5. The method according to claim 1, further comprising: triggering at the staff of said sequence an interrupt counter initialised to the value of the normal predetermined execution time of said sequence, by:

triggering an interrupt in the program execution on expiry of the counter; and diverting execution of said program to an interrupt management routine in order to check the point of arrival of said sequence.

6. The method according to claim 5, comprising:

if the execution time of said sequence is not normal, said interrupt management routine is immediately followed by a sequence to set a fraud indicator in memory or by an interruption of the current execution by another means.

7. The method according to claim 5, wherein the interrupt management routine is placed at the last location of the program memory or just before a shared domain boundary so as to leave the permitted program memory area if an attack prevents execution of the interrupt return.

8. The method according to claim 2, further comprising:

adding to said sequence instructions or loops or equivalent so as to equalise the execution time of the sequence in all its branches or so that the execution time of said sequence is modified if there is an attack.

9. The method according to claim 5, further comprising:

adding to said sequence instructions or loops or equivalent so as to equalise the execution time of the sequence in all its branches or so that the execution time of said sequence is modified if there is an attack.

10. The method according to claim 6, further comprising:

adding to said sequence instructions or loops or equivalent so as to equalise the execution time of the sequence in all its branches or so that the execution time of said sequence is modified if there is an attack.

11. The method according to claims 1, further comprising:

adding to said sequence instructions or loops or equivalent so as to equalise the execution time of the sequence in all its branches or so that the execution time of said sequence is modified if there is an attack.

12. A computer program including program code instructions to execute steps of the method according to claim 1 when said program is run in a computer system.

13. An electronic module having information processing means and information storage means containing a program to be executed, the electronic module comprising:

checking means including a counter timer with triggering of an interrupt on expiry a normal execution time of said sequence to check the point of arrival of at least one sequence of said program with respect to a planned point of arrival of said sequence, wherein:

said checking means being arranged for triggering said counter timer at the point of departure of execution of said at least one sequence of said program; and the checking means further including an interrupt handler routine for reading a program counter and having means for comparing the program counter against the planned point of arrival.

14. A card comprising the electronic module according to claim 13.

* * * * *